US010743274B2

(12) United States Patent
Ly et al.

(10) Patent No.: US 10,743,274 B2
(45) Date of Patent: Aug. 11, 2020

(54) PRIORITIZING SYNCHRONIZATION CHANNEL FREQUENCIES IN WIRELESS COMMUNICATIONS

(71) Applicant: QUALCOMM Incorporated, San Diego, CA (US)

(72) Inventors: Hung Ly, San Diego, CA (US); Peter Gaal, San Diego, CA (US); Heechoon Lee, San Diego, CA (US); Wanshi Chen, San Diego, CA (US); Haitong Sun, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 96 days.

(21) Appl. No.: 15/682,189

(22) Filed: Aug. 21, 2017

(65) Prior Publication Data
US 2018/0139715 A1 May 17, 2018

Related U.S. Application Data

(60) Provisional application No. 62/422,492, filed on Nov. 15, 2016.

(51) Int. Cl.
*H04W 56/00* (2009.01)
*H04W 72/04* (2009.01)
*H04W 72/14* (2009.01)

(52) U.S. Cl.
CPC ... *H04W 56/0025* (2013.01); *H04W 56/0035* (2013.01); *H04W 72/0453* (2013.01); *H04W 72/14* (2013.01)

(58) Field of Classification Search
CPC ......... H04W 56/0025; H04W 56/0035; H04W 72/0453; H04W 72/14; H04W 52/00
See application file for complete search history.

(56) References Cited

U.S. PATENT DOCUMENTS

| 8,811,252 B2 | 8/2014 | Maeda et al. |
| 9,456,373 B2 | 9/2016 | Kemmer et al. |
| 9,485,069 B2 | 11/2016 | Wang et al. |
| 9,553,701 B2 | 1/2017 | Sadeghi et al. |

(Continued)

FOREIGN PATENT DOCUMENTS

| WO | WO-2009077421 A1 | 6/2009 |
| WO | WO-2011057300 A2 | 5/2011 |

OTHER PUBLICATIONS

International Search Report and Written Opinion—PCT/US2017/061044—ISA/EPO—dated Feb. 1, 2018.

(Continued)

*Primary Examiner* — Jeffrey M Rutkowski
*Assistant Examiner* — Chae S Lee
(74) *Attorney, Agent, or Firm* — Arent Fox, LLP

(57) ABSTRACT

Aspects of the present disclosure describe acquiring a synchronization signal transmitted at a frequency location. An ordered list of possible frequency locations within a frequency band at which the synchronization signal may be transmitted can be obtained. The synchronization signal can be searched for at one or more possible frequency locations in the ordered list of possible frequency locations, where the searching is performed according to an order indicated in the ordered list of possible frequency locations.

24 Claims, 7 Drawing Sheets

(56) References Cited

U.S. PATENT DOCUMENTS

| | | | |
|---|---|---|---|
| 2005/0075125 A1* | 4/2005 | Bada | H04W 48/20 |
| | | | 455/525 |
| 2013/0155883 A1* | 6/2013 | Bhattacharjee | H04W 48/16 |
| | | | 370/252 |
| 2015/0009876 A1 | 1/2015 | Ye | |
| 2015/0119029 A1 | 4/2015 | Scribano | |
| 2015/0282052 A1* | 10/2015 | Wallen | H04W 48/16 |
| | | | 455/434 |
| 2016/0029333 A1 | 1/2016 | Seo et al. | |
| 2016/0219556 A1 | 7/2016 | Kim et al. | |
| 2018/0139084 A1* | 5/2018 | Jung | H04L 27/2657 |
| 2019/0013915 A1* | 1/2019 | Åström et al. | H04W 48/16 |
| 2019/0253959 A1* | 8/2019 | Wei | H04J 11/0069 |

OTHER PUBLICATIONS

Lucent Technologies: "A Flexible Method for Defining RF Channels for UMTS", 3GPP Draft; R2-99644, 3rd Generation Partnership Project (3GPP), Mobile Competence Centre; 650, Route Des Lucioles; F-06921 Sophia-Anti Polls Cedex; France, vol. RAN WG2, No. Sophia Antipolis; Jul. 26, 1999, XP050112982, [retrieved on Jul. 26, 1999], 15 pages.

* cited by examiner

PRIORITIZING SYNCHRONIZATION CHANNEL FREQUENCIES IN WIRELESS COMMUNICATIONS

CLAIM OF PRIORITY UNDER 35 U.S.C. § 119

The present Application for Patent claims priority to Provisional Application No. 62/422,492, entitled "PRIORITIZING SYNCHRONIZATION CHANNEL FREQUENCIES IN WIRELESS COMMUNICATIONS" filed Nov. 15, 2016, which is assigned to the assignee hereof and hereby expressly incorporated by reference herein for all purposes.

BACKGROUND

Aspects of the present disclosure relate generally to wireless communication systems, and more particularly, to performing synchronization between nodes in a wireless communication systems.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

For example, for 5G communications technology and beyond, the system may include a number of base stations, each simultaneously supporting communication for multiple communication devices, otherwise known as user equipment (UE). A base station may communicate with UEs on downlink channels (e.g., for transmissions from a base station to a UE) and uplink channels (e.g., for transmissions from a UE to a base station).

In a wireless multiple-access communication system, each cell of a network may broadcast synchronization signals for UEs to discover (e.g., primary synchronization signals (PSS), secondary synchronization signals (SSS), etc.). Accordingly, the UEs can synchronize timing and/or frequency to the cell based on the synchronization signals for receiving further communications from (or transmitting communications to) the cell. For example, the UEs can accordingly receive and decode system information from the cell, which can include further information for accessing the cell (e.g., master information blocks (MIB), system information blocks (SIB), etc. over a primary broadcast channel (PBCH) or similar channel).

Wireless communication systems such as a Long Term Evolution (LTE) communication systems or LTE-Advanced (LTE-A) communication systems transmit the synchronization signals over a center channel frequency of the system bandwidth. As LTE uses limited system bandwidth, the UEs can attempt to discover the synchronization signals using a channel raster with multiple channel hypotheses over the system bandwidth. As system bandwidth increases, however, attempts to discover the synchronization signals based on the same channel raster may become burdensome. For example, 5G NR may have wide frequency band deployments, which may increase the number of possible channel hypotheses. Also, downlink cell-specific reference signals (CRS) may not be broadcast at all, or may not be broadcast frequently enough, to facilitate scanning for signals for system acquisition (e.g., especially in a time division duplexing subframe). In addition, using the same channel raster for transmitting signals in LTE and 5G NR may lead to waveform confusion as to which radio access technology is being used where LTE and 5G NR use OFDM-based waveforms on the downlink.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for acquiring, by a user equipment (UE), a synchronization signal transmitted at a frequency location is provided. The method includes obtaining an ordered list of possible frequency locations within a frequency band at which the synchronization signal may be transmitted, and searching for the synchronization signal at one or more possible frequency locations in the ordered list of possible frequency locations, where the searching the one or more possible frequency locations is performed according to an order indicated in the ordered list of possible frequency locations.

In another example, a method for transmitting, by a base station, a synchronization signal at a frequency location is provided. The method includes obtaining an ordered list of possible frequency locations within a frequency band at which synchronization signals may be transmitted, selecting a synchronization channel frequency from the ordered list of possible frequency locations, and transmitting the synchronization signal at the synchronization channel frequency of the frequency band.

In another example, an apparatus for wireless communication is provided. The apparatus includes a transceiver for communicating one or more wireless signals via one or more antennas, a memory configured to store instructions, and at least one processor communicatively coupled with the transceiver and the memory. The at least one processor is configured to obtain an ordered list of possible frequency locations within a frequency band at which the synchronization signal may be transmitted, and search for the synchronization signal at one or more possible frequency locations in the ordered list of possible frequency locations, where the searching the one or more possible frequency locations is performed according to an order indicated in the ordered list of possible frequency locations.

In another example, an apparatus for wireless communication is provided including a transceiver for communicating one or more wireless signals via one or more antennas, a memory configured to store instructions, and at least one processor communicatively coupled with the transceiver and the memory. The at least one processor is configured to obtain an ordered list of possible frequency locations within a frequency band at which synchronization signals may be transmitted, select a synchronization channel frequency from the ordered list of possible frequency locations, and transmit the synchronization signal at the synchronization channel frequency of the frequency band.

In a further aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
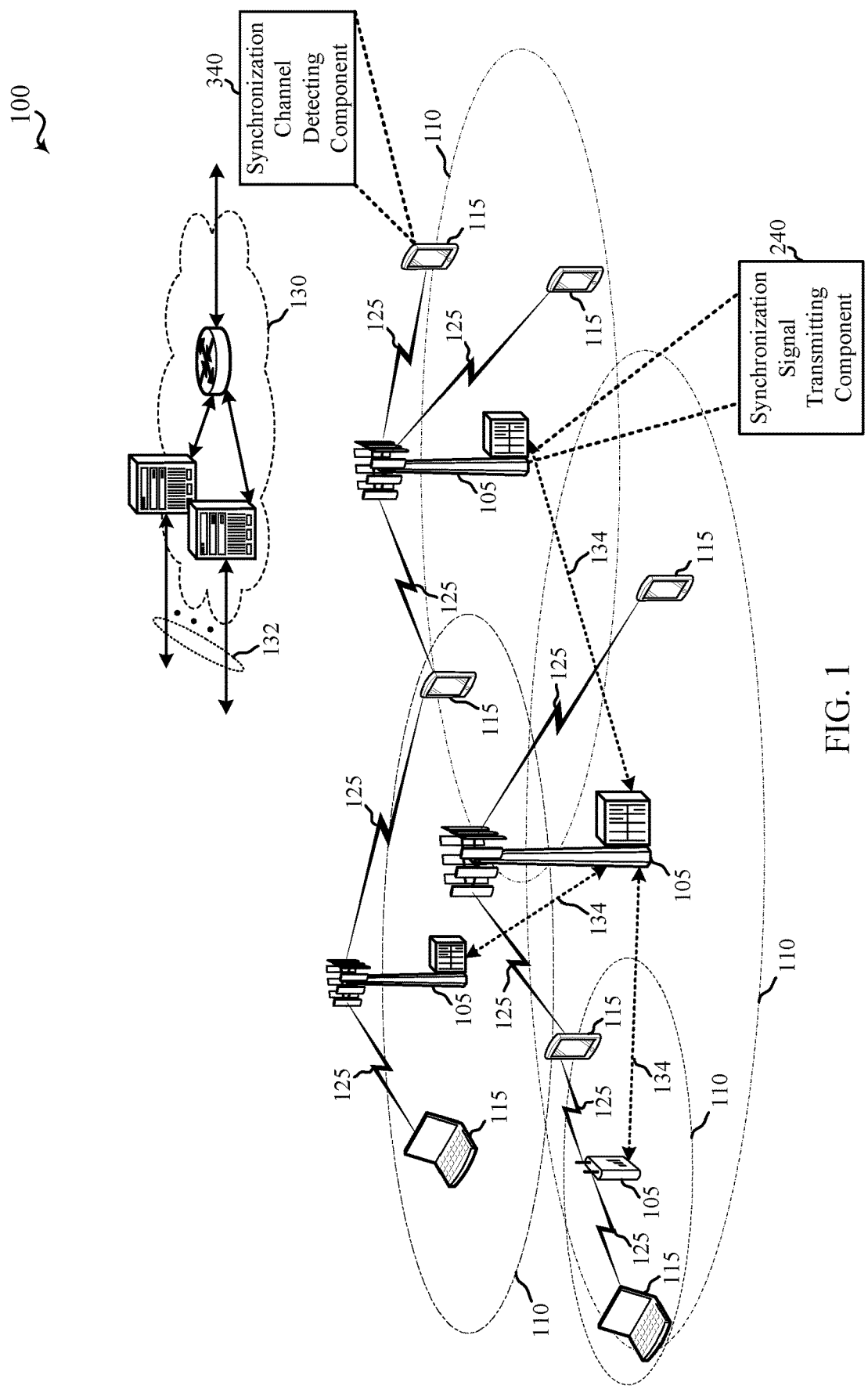
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to communicating and detecting synchronization signals in a wireless communication system. A network component of the wireless communication system, such as an evolved Node B (eNB), gNodeB (gNB), or other base station or related cell, can utilize a synchronization channel for transmitting a synchronization signal, where a synchronization channel frequency of the synchronization channel can be different from a center carrier frequency of the system bandwidth, though the channel bandwidth of the synchronization channel can be within the system bandwidth. For example, the synchronization channel frequency can be an integer multiple of a synchronization channel raster, where the synchronization channel raster can be coarser or larger than a channel raster used to define the center carrier frequency of the system bandwidth (e.g., for transmitting signals other than the synchronization signals). Thus, a wireless device, such as a user equipment (UE), attempting to synchronize timing and/or frequency with the network can attempt to detect the synchronization signals based on the synchronization channel frequencies with the coarser synchronization channel raster, which may alleviate some processing demands associated with otherwise searching for the synchronization signal based on the channel raster used for other communications.

To provide addition flexibility, for example, the minimum system bandwidth for the wireless communication system may include at least one synchronization channel frequency at which the synchronization signal can be fully transmitted. In this regard, the network component can select one of the one or more synchronization channel frequency locations within a frequency band (e.g., corresponding to a carrier frequency) for transmitting the synchronization signals, and the UE can accordingly attempt to detect the synchronization signals at one or more of the synchronization channel frequency locations (e.g., until the synchronization signals are detected). The synchronization channel frequency locations or frequency locations of synchronization signals can be defined based on the synchronization channel raster. For example, the synchronization channel frequency locations can be the integer multiple of the synchronization channel raster within the system bandwidth. Moreover, to improve the cell search latency, a UE can obtain an ordered list of possible frequency locations of frequency bands, and can search for the synchronization signals at the possible frequency locations based on the order specified by the ordered list. For example, the ordered list may be ordered based on various criteria. For example, the ordered list may be ordered based on radio frequency characteristics at the frequency locations, deployment flexibility using the frequency locations, deployment efficiency based on the frequency locations, observed or predicted deployment use cases based on the frequency locations, etc. This can allow the UE to perform a more prioritized search based on which frequency locations are more likely utilized by detected network components for transmitting the synchronization signals.

The ordered list can be configured in a memory of the UE, in the network component transmitting the synchronization signals, and/or another network component that may configured the UE. For example, the ordered list may be specified in a specification and accordingly coded into a memory of the UE and/or network component. In this example, the network component (e.g., eNB, gNB, etc.) can select a synchronization channel frequency from the ordered list (e.g., based on the order indicated by the ordered list), and can transmit synchronization signals at the selected synchronization channel frequency. In this or another example, the network component can signal a reduced ordered list of possible frequency locations to the UE. For example, the network component can negotiate frequency locations with the neighboring network components (e.g., via backhaul communication among the network components), can determine a reduced ordered list of possible frequency locations, which can be a subset of the possible frequency locations for the synchronization channel, based on the negotiated frequency locations, and can transmit the reduced ordered list to the UE. In any case, the UE can obtain the ordered list and/or the reduced ordered list, and can accordingly search the frequency locations for one or more synchronization signals. This can allow the UE to save resources by searching the most likely frequency locations (as indicated by the ordered list or reduced ordered list) first, which can decrease latency the otherwise may be associated with blindly searching frequency locations for synchronization signals.

The described features will be presented in more detail below with reference to FIGS. 1-7.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 illustrates an example of a wireless communication system 100 in accordance with various aspects of the present disclosure. The wireless communication system 100 may include one or more base stations 105, one or more UEs 115, and a core network 130. The core network 130 may provide user authentication, access authorization, tracking, internet protocol (IP) connectivity, and other access, routing, or mobility functions. The base stations 105 may interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a network entity, a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may be or include a Long Term Evolution (LTE) or LTE-Advanced (LTE-A) network. The wireless communication system 100 may also be a next generation network, such as a 5G wireless communication network. In LTE/LTE-A networks, the term evolved node B (eNB), gNB, etc. may be generally used to describe the base stations 105, while the term UE may be generally used to describe the UEs 115. The wireless communication system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs 115 with service subscriptions with the network provider.

A small cell may include a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB, gNB, etc. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A MAC layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an entertainment device, a vehicular component, or the like. A UE may be able to communicate with various types of base stations and network equipment including macro eNBs, small cell eNBs, relay base stations, and the like.

The communication links 125 shown in wireless communication system 100 may carry UL transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different subcarrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In aspects of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In aspects of the wireless communication system 100, a base station 105 may include a synchronization signal transmitting component 240 (see e.g., FIG. 2) configured to transmit one or more synchronization signals at a synchronization channel frequency, where the synchronization channel frequency for transmitting the synchronization signals is determined as one of a plurality of possible synchronization channel frequencies corresponding to a synchronization channel raster, which may be determined based on an ordered list of possible frequencies for transmitting the synchronization signals. For example, the synchronization channel raster may indicate the plurality of possible synchronization channel frequencies (e.g., possible center frequencies around which the synchronization channel may be based) based on a first possible synchronization channel frequency and an offset of one or more other possible synchronization channel frequencies, etc.

In some aspects of the wireless communication system 100, a UE 115 may include a synchronization channel frequency detecting component 340 (see e.g., FIG. 3) configured to detect a synchronization channel frequency as one of a plurality of possible synchronization channel frequencies, which can include searching for synchronization signals at one or more possible synchronization channel frequencies specified in an ordered list of possible synchronization channel frequencies until one or more synchronization signals are detected. As described above, the synchronization channel raster can be coarser than a channel raster used by the base station 105 and/or UE 115 where the channel raster is used to define the center carrier frequency of the system bandwidth.

In a specific example, wireless communication system 100 may have a UE-centric MAC layer. On the network side, the base stations 105 may broadcast a synchronization signal. The synchronization signal may be a unified synchronization signal that is supported by systems using a UE-centric MAC layer (e.g., UECM networks) as well as systems using a network-centric or non UE-centric MAC layer (e.g., nUECM networks). The UEs 115 may receive the synchronization signal by detecting the synchronization signal using multiple hypotheses for the synchronization channel frequency, as described above and further herein. The UEs 115 may then acquire a timing of the network from the synchronization signal, and in response to acquiring the timing of the network, the UEs 115 may transmit a chirp signal that can indicate one or more signals requested from the base station 105 on-demand. The base station 105 can accordingly transmit the one or more signals over one or more channels to the UE 115 (e.g., master information block (MIB) and/or system information block (SIB) signals over a primary broadcast channel (PBCH), etc.).

In a specific example, in LTE, a channel raster can be defined for possible locations of the center frequency or a direct current (DC) of a system bandwidth, which can facilitate UEs detecting the center carrier frequency of the system bandwidth for LTE and accordingly receiving and/or transmitting signals centered around the center frequency. In LTE, synchronization signals, such as primary synchronization signals (PSS), secondary synchronization signals (SSS), primary broadcast channel (PBCH), etc.) can be transmitted substantially symmetrically around the DC (e.g., around the center carrier frequency). In new radio (NR) technologies, such as 5G, the synchronization channel raster can be defined, which can be a subset of the channel raster and can include multiple frequency locations on a coarser raster (e.g., 1.8 MHz) than the channel raster (e.g., 100 kHz) for efficient cell searching and forward compatibility, where the synchronization channel frequency can be different than the center carrier frequency used for other signaling. For a frequency band, the UE can search for the synchronization signals at each frequency location in the frequency band according to the synchronization channel raster until synchronization signals are detected. The initial acquisition and cell search latency may be long if the UE has to scan over all or many of the possible synchronization channel frequency locations in the frequency band.

Accordingly, for example, the UE and/or network component may obtain an ordered list of possible frequency locations for the synchronization channel, and can respectively search and/or select at least one of the possible frequency locations, based on an order indicated by the ordered list, for receiving and/or transmitting one or more synchronization signals. For example, at the UE, for each frequency band, the possible frequency locations can be ordered from a possible synchronization channel frequency based on the priority (e.g., ordered from a highest priority to one of a lowest priority). Moreover, in an example, the synchronization channel frequency locations may be grouped into priority groups, which can be ordered in the ordered list based on the priority. In either case, the list can be standardized and/or hardcoded in a memory of the UE, received from the network component or another component configuring the UE, etc. For each frequency band, the UE can search for synchronization signals at the possible frequency locations in the ordered list according to an order specified by the ordered list starting with the frequency locations of high priority until one or more synchronization signals are correctly detected. This example can correspond to an initial acquisition of the system by the UE, and this process may be more efficient by analyzing more probable frequencies first.

In another example, the network component can signal a reduced set of possible frequency locations to the UE, which can include a case where synchronization signals of neighboring network components (e.g., eNBs, cells, etc.) are transmitted at a same frequency location as the synchronization signals of a serving cell serving the UE. In this example, frequency locations of synchronization signals in the reduced set of possible frequency locations can be ordered for each frequency band, and the UE can accordingly perform intra-frequency or inter-frequency cell search faster based on the reduced ordered list. For each frequency band in the reduced ordered list, the UE can search for synchronization signals at the possible frequency locations in the reduced ordered list according to an order specified by the ordered list starting with the frequency locations of high priority until one or more synchronization signals are correctly detected. This example can correspond to an intra-frequency and/or inter-frequency cell search by the UE (e.g., in measurement gaps received from the serving cell).

Figure 2:
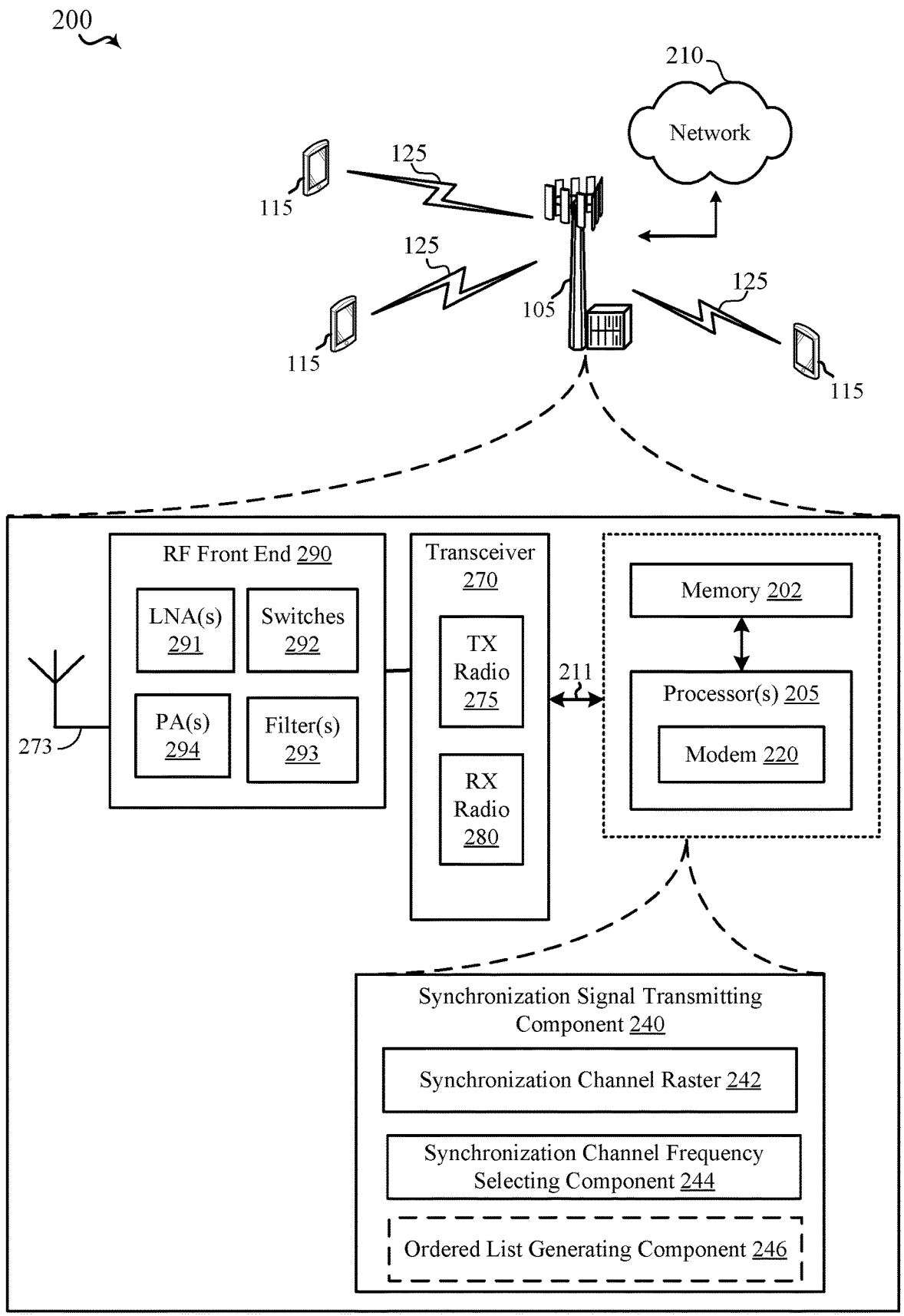
FIG. 2 is a block diagram illustrating an example of a base station, in accordance with various aspects of the present disclosure.
Figure 3:
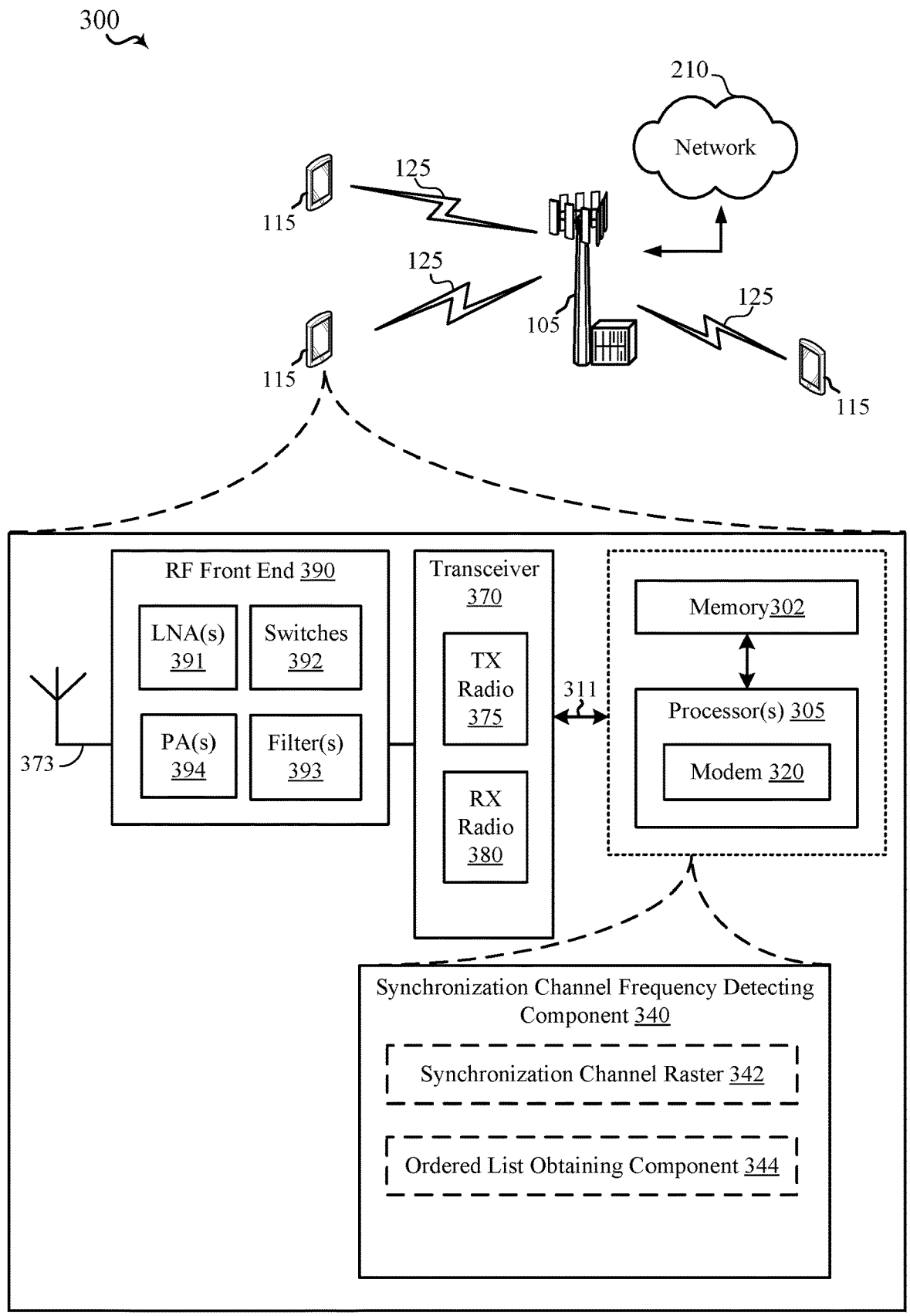
FIG. 3 is a block diagram illustrating an example of a UE, in accordance with various aspects of the present disclosure.
Figure 4:
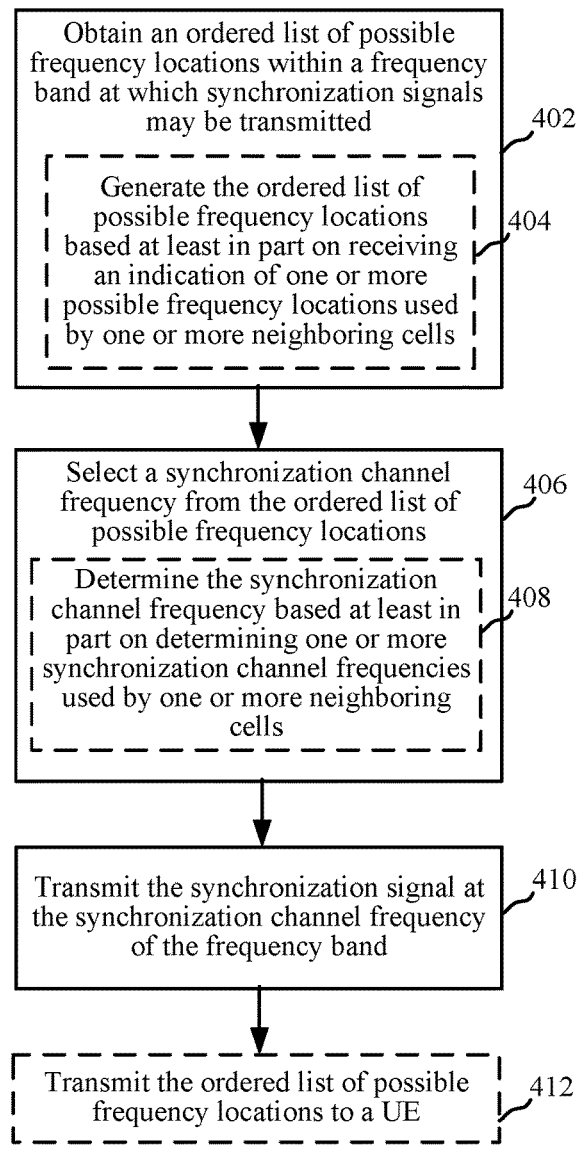
FIG. 4 is a flow chart illustrating an example of a method for transmitting synchronization signals, in accordance with various aspects of the present disclosure.
Figure 5:
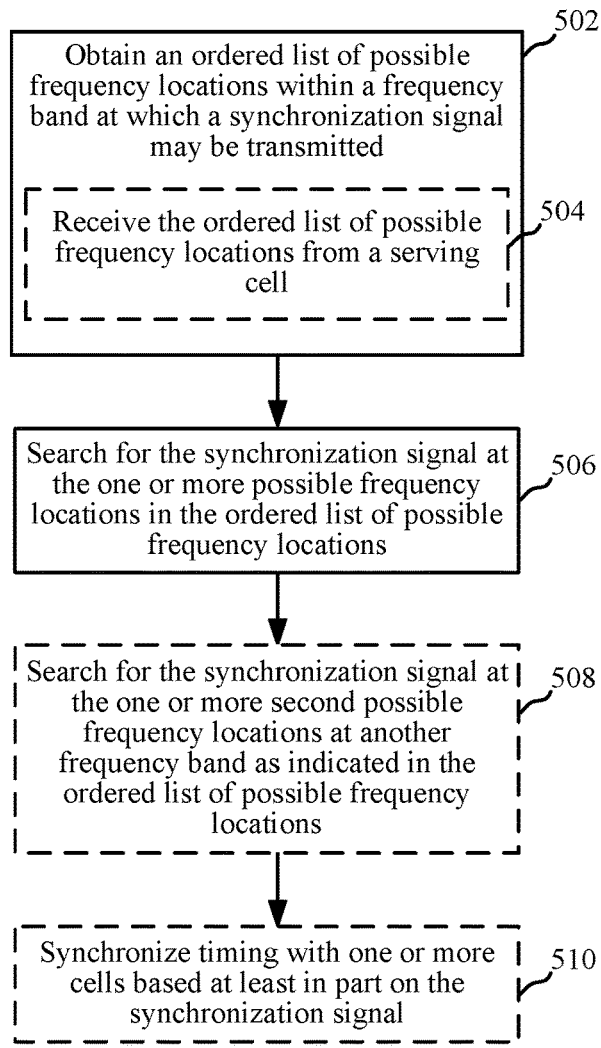
FIG. 5 is a flow chart illustrating an example of a method for searching for synchronization signals, in accordance with various aspects of the present disclosure.

Turning now to FIGS. 2-5, aspects are depicted with reference to one or more components and one or more methods that may perform the actions or operations described herein, where aspects in dashed line may be optional. Although the operations described below in FIGS. 4 and 5 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, a block diagram 200 is shown that includes a portion of a wireless communications system having multiple UEs 115 in communication with a base station 105 via communication links 125, where the base station 105 is also connected to a network 210. The UEs 115 may be examples of the UEs described in the present disclosure that are configured to detect and process synchronization signals at one of a plurality of possible synchronization channel frequencies. Moreover the base station 105 may be an example of the base stations described in the present disclosure (e.g., eNB, gNB, etc. providing one or more macrocells, small cells, etc.) that are configured to transmit synchronization signals at one of a plurality of possible synchronization channel frequencies. In an example, the base station 105 in FIG. 2 may be part of a UECM network and may transmit a unified synchronization signal with other base stations.

In an aspect, the base station in FIG. 2 may include one or more processors 205 and/or memory 202 that may operate in combination with a synchronization signal transmitting component 240 to perform the functions or methods (e.g., method 400 of FIG. 4) presented in the present disclosure. In accordance with the present disclosure, the synchronization signal transmitting component 240 may include a synchronization channel raster 242 for providing a plurality of possible frequencies where a center carrier frequency for transmitting a synchronization channel can be placed, a synchronization channel frequency selecting component 244 configured for selecting a synchronization channel frequency from a plurality of synchronization channel frequencies in the synchronization channel raster 242 for transmitting one or more synchronization signals, and/or an optional ordered list generating component 246 for generating a reduced ordered list of possible synchronization channel frequencies corresponding to neighboring cells for use by one or more UEs in searching synchronization channel frequencies for synchronization signals.

The one or more processors 205 may include a modem 220 that uses one or more modem processors. The various functions related to the synchronization signal transmitting component 240, and/or its sub-components, may be included in modem 220 and/or processor 205 and, in an aspect, can be executed by a single processor, while in other aspects, different ones of the functions may be executed by a combination of two or more different processors. For example, in an aspect, the one or more processors 205 may include any one or any combination of a modem processor, or a baseband processor, or a digital signal processor, or a transmit processor, or a transceiver processor associated with transceiver 270, or a system-on-chip (SoC). In particular, the one or more processors 205 may execute functions and components included in the synchronization signal transmitting component 240.

In some examples, the synchronization signal transmitting component 240 and each of the sub-components may comprise hardware, firmware, and/or software and may be configured to execute code or perform instructions stored in a memory (e.g., a computer-readable storage medium, such as memory 202 discussed below). Moreover, in an aspect, the base station 105 in FIG. 2 may include a radio frequency (RF) front end 290 and transceiver 270 for receiving and transmitting radio transmissions to, for example, UEs 115. The transceiver 270 may coordinate with the modem 220 to transmit signals generated by the synchronization signal transmitting component 240 to the UEs. RF front end 290 may be connected to one or more antennas 273 and can include one or more switches 292, one or more amplifiers (e.g., power amplifiers (PAs) 294 and/or low-noise amplifiers 291), and one or more filters 293 for transmitting and receiving RF signals on uplink channels and downlink channels. In an aspect, the components of the RF front end 290 can connect with transceiver 270. The transceiver 270 may connect to one or more of modem 220 and processors 205.

The transceiver 270 may be configured to transmit (e.g., via transmitter (TX) radio 275) and receive (e.g., via receiver (RX) radio 280) wireless signals through antennas 273 via the RF front end 290. In an aspect, the transceiver 270 may be tuned to operate at specified frequencies such that the base station 105 can communicate with, for example, UEs 115. In an aspect, for example, the modem 220 can configure the transceiver 270 to operate at a specified frequency and power level based on the configuration of the base station 105 and communication protocol used by the modem 220.

The base station 105 in FIG. 2 may further include a memory 202, such as for storing data used herein and/or local versions of applications or synchronization signal transmitting component 240 and/or one or more of its sub-components being executed by processor 205. Memory 202 can include any type of computer-readable medium usable by a computer or processor 205, such as random access memory (RAM), read only memory (ROM), tapes, magnetic discs, optical discs, volatile memory, non-volatile memory, and any combination thereof. In an aspect, for example, memory 202 may be a computer-readable storage medium that stores one or more computer-executable codes defining synchronization signal transmitting component 240 and/or one or more of its sub-components. Additionally or alternatively, the base station 105 may include a bus 211 for coupling one or more of the RF front end 290, the transceiver 274, the memory 202, or the processor 205, and to exchange signaling information between each of the components and/or sub-components of the base station 105.

In an aspect, the processor(s) 205 may correspond to one or more of the processors described in connection with the base station in FIG. 7. Similarly, the memory 202 may correspond to the memory described in connection with the base station in FIG. 7.

Referring to FIG. 3, a block diagram 300 is shown that includes a portion of a wireless communications system having multiple UEs 115 in communication with a base station 105 via communication links 125, where the base station 105 is also connected to a network 210. The UEs 115 may be examples of the UEs described in the present disclosure that are configured to detect and process synchronization signals at one of a plurality of possible synchronization channel frequencies where synchronization channel frequency is an integer multiple of the synchronization channel raster. Moreover the base station 105 may be an example of the base stations described in the present disclosure that are configured to transmit synchronization signals at one of a plurality of possible synchronization channel frequencies in a synchronization channel raster.

In an aspect, the UE 115 in FIG. 3 may include one or more processors 305 and/or memory 302 that may operate in combination with a synchronization channel frequency detecting component 340 to perform the functions or methods (e.g., method 500 of FIG. 5) presented in the present disclosure. In accordance with the present disclosure, the synchronization channel frequency detecting component 340 may optionally include a synchronization channel raster 342 configured for determining a synchronization channel raster for attempting to detect the synchronization channel in one or more synchronization signals transmitted at one of a plurality of possible synchronization channel frequencies, and/or an optional ordered list obtaining component 344 for obtaining an ordered list of the possible synchronization channel frequencies for determining an order over which to search the possible synchronization channel frequencies.

The one or more processors 305 may include a modem 320 that uses one or more modem processors. The various functions related to the synchronization channel frequency detecting component 340, and/or its sub-components, may be included in modem 320 and/or processor 305 and, in an aspect, can be executed by a single processor, while in other aspects, different ones of the functions may be executed by a combination of two or more different processors. For example, in an aspect, the one or more processors 305 may include any one or any combination of a modem processor, or a baseband processor, or a digital signal processor, or a transmit processor, or a transceiver processor associated with transceiver 370, or a system-on-chip (SoC). In particular, the one or more processors 305 may execute functions and components included in the synchronization channel frequency detecting component 340.

In some examples, the synchronization channel frequency detecting component 340 and each of the sub-components may comprise hardware, firmware, and/or software and may be configured to execute code or perform instructions stored in a memory (e.g., a computer-readable storage medium, such as memory 302 discussed below). Moreover, in an aspect, the UE 115 in FIG. 3 may include an RF front end 390 and transceiver 370 for receiving and transmitting radio transmissions to, for example, base stations 105. The transceiver 370 may coordinate with the modem 320 to detect and/or receive synchronization signals to be processed by the synchronization channel frequency detecting component 340. RF front end 390 may be connected to one or more antennas 373 and can include one or more switches 392, one or more amplifiers (e.g., PAs 394 and/or LNAs 391), and one or more filters 393 for transmitting and receiving RF signals on uplink channels and downlink channels. In an aspect, the components of the RF front end 390 can connect with transceiver 370. The transceiver 370 may connect to one or more of modem 320 and processors 305.

The transceiver 370 may be configured to transmit (e.g., via transmitter (TX) radio 375) and receive (e.g., via receiver (RX) radio 380) wireless signals through antennas 373 via the RF front end 390. In an aspect, the transceiver 370 may be tuned to operate at specified frequencies such that the UE 115 can communicate with, for example, base stations 105. In an aspect, for example, the modem 320 can configure the transceiver 370 to operate at a specified frequency and power level based on the configuration of the UE 115 and communication protocol used by the modem 320.

The UE 115 in FIG. 3 may further include a memory 302, such as for storing data used herein and/or local versions of applications or synchronization channel frequency detecting component 340 and/or one or more of its sub-components being executed by processor 305. Memory 302 can include any type of computer-readable medium usable by a computer or processor 305, such as RAM, ROM, tapes, magnetic discs, optical discs, volatile memory, non-volatile memory, and any combination thereof. In an aspect, for example, memory 302 may be a computer-readable storage medium that stores one or more computer-executable codes defining synchronization channel frequency detecting component 340 and/or one or more of its sub-components. Additionally or alternatively, the UE 115 may include a bus 311 for coupling one or more of the RF front end 390, the transceiver 374, the memory 302, or the processor 305, and to exchange signaling information between each of the components and/or sub-components of the UE 115.

In an aspect, the processor(s) 305 may correspond to one or more of the processors described in connection with the UE in FIG. 7. Similarly, the memory 302 may correspond to the memory described in connection with the UE in FIG. 7.

FIG. 4 illustrates a flow chart of an example of a method 400 for transmitting (e.g., from a base station), one or more synchronization signals at one of a plurality of possible synchronization channel frequencies.

At Block 402, the base station may obtain an ordered list of possible frequency locations within a frequency band at which synchronization signals may be transmitted. In an aspect, synchronization channel frequency selecting component 244, e.g., in conjunction with processor(s) 205 and/or memory 202, can obtain the ordered list of possible frequency locations within the frequency band at which synchronization signals may be transmitted. For example, synchronization channel frequency selecting component 244 may obtain the ordered list of possible frequency locations from a configuration stored in memory 202, which can be based on a technical specification or standard for a wireless communication technology (e.g., LTE, 5G NR, etc.), or otherwise generally known. In one example, the ordered list may indicate, for a given frequency band, a list of possible frequency locations (e.g., among channel raster locations of the frequency band) for transmitting synchronization signals. In an example, the list of possible frequency locations can correspond to specific indications of frequency and/or channel numbers (e.g., E-UTRA Absolute radio-frequency channel number (EARFCN)), an index of a frequency along the synchronization channel raster 242 as applied to the frequency band, etc. The ordered list of possible frequency locations can be ordered based on a highest priority (e.g., from highest priority to lowest priority) and/or may include frequency locations grouped in priority groups (e.g., a number of possible frequency locations in a first group, a number of possible frequency locations in a second group, etc.).

In one example, in obtaining the ordered list of possible frequency locations, the base station may, at Block 404, generate the ordered list of possible frequency locations based at least in part on receiving an indication of one or more possible frequency locations used by one or more neighboring cells. In an aspect, ordered list generating component 246, e.g., in conjunction with processor(s) 205 and/or memory 202, can generate the ordered list of possible frequency locations based at least in part on receiving the indication of one or more possible frequency locations used by the one or more neighboring cells. In an example, ordered list generating component 246 may receive the indication of the one or more possible frequency location used by the one or more neighboring cells based on backhaul communications among the cells (e.g., where ordered list generating component 246 can receive indications of the one or more possible frequency locations from each of the neighboring cells over the backhaul link, negotiate which possible frequency locations can be used by which cells over the backhaul link, etc.). In another example, ordered list generating component 246 can receive the indication of the one or more possible frequency locations used by the one or more neighboring cells from one or more UEs (e.g., based on a measurement report or other detection/reporting mechanism where the UE can detect synchronization signals from the one or more neighboring cells at the one or more possible frequency locations, and can report the one or more possible frequency locations to the base station 105).

In any case, for example, ordered list generating component 246 can generate a reduced ordered list of possible frequency locations based on the frequency locations used by the one or more neighboring cells. For example, ordered list generating component 246 can generate the reduced ordered list to include the possible frequency locations determined to be used by the one or more neighboring cells (and the serving cell) without necessarily including other frequency locations from the ordered list that may have been obtained from the configuration of the base station 105.

In method 400, at Block 406, the base station may select a synchronization channel frequency from the ordered list of possible frequency locations. In an aspect, synchronization channel frequency selecting component 244, e.g., in conjunction with processor(s) 205 and/or memory 202, can select the synchronization channel frequency from the ordered list of possible frequency locations. For example, synchronization channel frequency selecting component 244 can select the synchronization channel frequency based on an order indicated in the ordered list of possible frequency locations. For example, synchronization channel frequency selecting component 244 can select a highest priority frequency in the ordered list, one frequency from a group of frequencies indicated as having the highest priority in the ordered list, etc.

In another example, in selecting the synchronization channel frequency, the base station may optionally, at Block 408, determine the synchronization channel frequency based at least in part on determining one or more synchronization channel frequencies used by one or more neighboring cells. For example, synchronization channel frequency selecting component 244, e.g., in conjunction with processor(s) 205 and/or memory 202, can determine synchronization channel frequency based at least in part on determining the one or more synchronization channel frequencies used by the one or more neighboring cells. For example, synchronization channel frequency selecting component 244 can determine the synchronization channel frequency based on negotiating frequency locations with neighboring base stations (e.g., to ensure a number of base stations less than a threshold are utilizing a given frequency location as the synchronization channel frequency), determining which of the possible frequency locations are utilized less than a threshold utilization by neighboring cells, etc. In the latter example, synchronization channel frequency selecting component 244 may determine the utilization of the possible frequency locations based on detecting a strength or number of synchronization signals transmitted at the possible frequency locations (e.g., based on a received power at the base station 105 or as otherwise reported by the UE, etc.). For example, synchronization channel frequency selecting component 244 can evaluate the possible frequency locations by determining the utilization according to the order specified in the ordered list until a frequency location having a determined or received utilization that is less than a threshold utilization is determined. In either case, the determined synchronization channel frequency can be selected for the base station 105 (or related cell).

With the synchronization channel frequency selected, the base station, at Block 410, can transmit the synchronization signal at the synchronization channel frequency of the frequency band. In an aspect, synchronization signal transmitting component 240, e.g., in conjunction with processor(s) 205, memory 202, and/or transceiver 270, can transmit the synchronization signal at the synchronization channel frequency of the frequency band. For example, synchronization signal transmitting component 240 can transmit the synchronization signal at a center carrier frequency defined by the synchronization channel frequency and around a portion of system bandwidth. In addition, for example, synchronization signal transmitting component 240 may include a DC at the center carrier frequency.

In method 400, the base station may, optionally at Block 412, transmit the ordered list of possible frequency locations to a UE. In an aspect, ordered list generating component 246, e.g., in conjunction with processor(s) 205, memory 202, and/or transceiver 270, can transmit (e.g., via radio resource control (RRC) layer signaling) the ordered list of possible frequency locations to the UE (e.g., UE 115), where the UE 115 may be served by a cell of the base station 105. As described, for example, the ordered list may be a reduced list of possible frequency locations based on the frequency locations reported by neighboring cells. In one example, the ordered list may include possible frequency locations within the frequency band used by the base station 105 and/or other possible frequency locations at one or more other frequency bands, which can allow the UE 115 to efficiently perform intra-frequency and/or inter-frequency scanning for synchronization signals based on the frequency locations provided in the ordered list. As described above and further herein, the UE 115 can receive the reduced ordered list, and can utilize the list in determining synchronization channel frequency locations at which to search for synchronization signals from one or more cells. For example, ordered list generating component 246 can transmit the ordered list along with, or based at least in part on, a measurement gap configuration including one or more measurement gaps indicating periods of time the UE 115 can search for synchronization signals from other cells, where the base station 105 can refrain from communicating with the UE 115 during the measurement gaps.

In one example, the ordered list of possible frequency locations can correspond to frequency locations that are integer multiples of the synchronization channel raster 242. For example, a minimum system bandwidth used by the base station 105 can include at least one synchronization channel frequency at which synchronization signals can be fully transmitted (e.g., transmitted without leaking into a guard band and/or outside of the system bandwidth). This can allow the transceiver 270 to place a center carrier frequency on substantially any channel raster within the frequency band and can allow synchronization signal transmitting component 240 to transmit a full synchronization channel regardless of center carrier frequency selection, as described further below. Thus, allowing a plurality of possible synchronization channel frequencies in the synchronization channel raster 242 can provide flexibility to network operations (of base station 105) to select the center carrier frequency for wireless communications. In an example, synchronization channel frequency selecting component 244 can select the synchronization channel frequency based at least in part on a center carrier frequency of the frequency band, a capability of transmitting the full synchronization signals around one or more synchronization channel frequencies, randomly selecting a synchronization channel frequency out of synchronization channel frequencies within the minimum system bandwidth which can transmit full synchronization signals, etc.

In addition, for example, the synchronization channel raster 242 can be different from a channel raster used to define the center carrier frequency of the frequency band. For example, the synchronization channel raster 242 can be coarser than the channel raster to allow a UE to detect the synchronization signal at one of the plurality of possible synchronization channel frequencies using less hypotheses than for carrier frequencies defined based on the channel raster. For example, where the channel raster is 100 kHz in LTE, the synchronization channel raster 242 may be a number of MHz, such as 1.8 MHz, meaning that synchronization channel frequencies may be spaced by the synchronization channel raster 242 over the LTE system bandwidth (e.g., every 1.8 MHz).

Additionally, for example, the synchronization channel raster 242 can be defined to comply with the channel raster and a subcarrier spacing defined for the wireless communication technology used by the base station 105. For example, the synchronization channel raster 242 may be configured to be a least common multiple of channel raster (e.g., spacing between center carrier frequencies) and the subcarrier spacing. In this regard, synchronization signal transmitting component 240 may not need to indicate a frequency offset between the synchronization channel raster 242 and the channel raster or subcarrier spacing to facilitate detection of a synchronization channel on the synchronization channel raster 242. In yet another example, synchronization channel raster 242 may be based on a bandwidth used for transmitting the synchronization signals as well.

Figure 6:
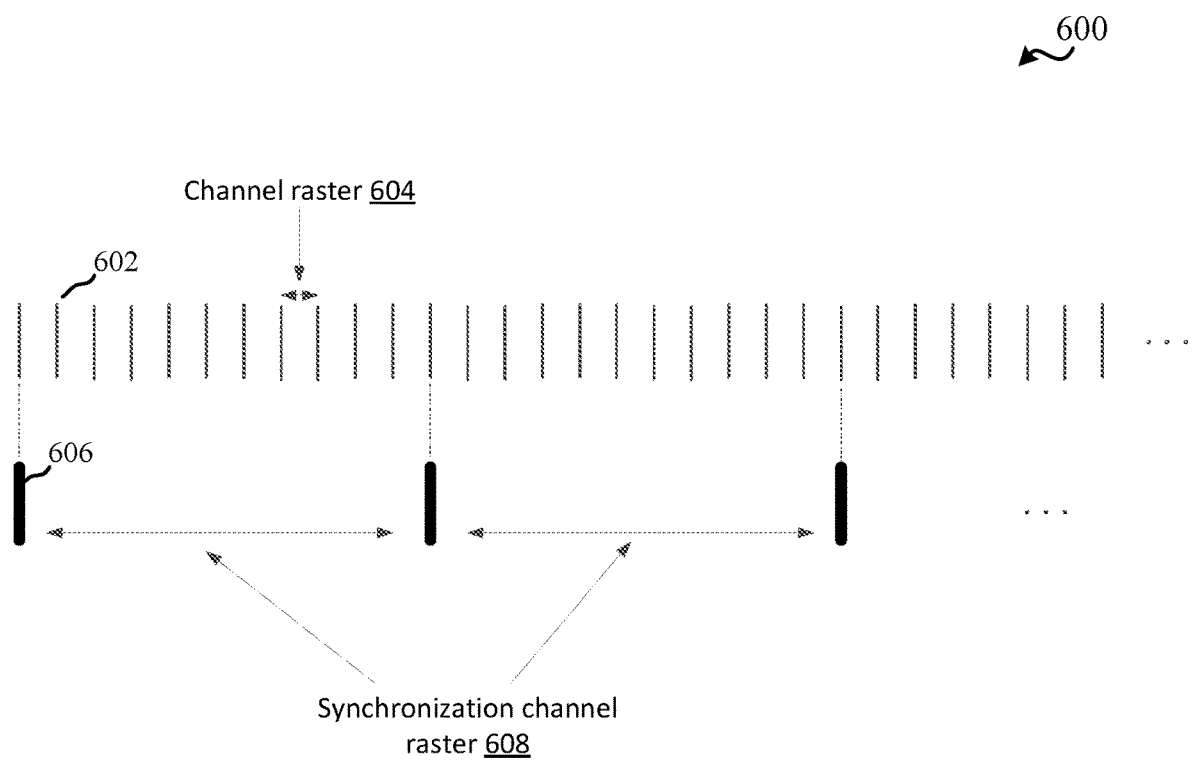
FIG. 6 is a diagram of an example of a system bandwidth allocations in accordance with various aspects of the present disclosure.

A specific example of the synchronization channel raster 242 configuration is shown in FIG. 6. FIG. 6 illustrates an example minimum system bandwidth 600 having a plurality of possible center carrier frequencies 602 over a channel raster 604 of the system bandwidth 600 over which can be selected as the frequency for the system channel. In addition, system bandwidth 600 may include a plurality of possible frequency locations 606 of the synchronization channel over a synchronization channel raster 608 that can be selected as a synchronization channel frequency, where the synchronization channel raster 608 is coarser than the channel raster 604 to lessen the time needed to detect a synchronization signal over one of the synchronization channel frequencies. Additionally, in this regard, the selected synchronization channel frequency can be different from the center channel frequency used for transmitting other channels.

FIG. 5 illustrates a flow chart of an example of a method 500 for determining (e.g., by a UE) a possible frequency locations over which to search for one or more synchronization signals received at one of a plurality of possible synchronization channel frequencies.

In method 500, at Block 502, the UE can obtain an ordered list of possible frequency locations within a frequency band at which a synchronization signal may be transmitted. In an aspect, ordered list obtaining component 344, e.g., in conjunction with processor(s) 305, memory 302, and/or transceiver 370, can obtain the ordered list of possible frequency locations within the frequency band at which the synchronization signal may be transmitted. For example, ordered list obtaining component 344 can obtain the ordered list from a configuration stored in a memory of the UE 115, where the ordered list can correspond to a standard or technical specification, and can be ordered based on a priority at which the UE is to search for synchronization signals at the possible frequency locations. For example, the ordered list may be ordered from a highest to lowest priority. Moreover, in an example, the ordered list may be based on one or more groups of frequency locations, where the groups are prioritized. Moreover, for example, the ordered list may include possible frequency locations related to each of a plurality of frequency bands. In addition, the possible frequency locations can be based on the synchronization channel raster (e.g., synchronization channel raster 342, synchronization channel raster 608, etc.), as described.

In one example, in obtaining the ordered list, the UE may optionally, at Block 504, receive the ordered list of possible frequency locations from a serving cell. In an aspect, ordered list obtaining component 344, e.g., in conjunction with processor(s) 305, memory 302, and/or transceiver 370, can receive the ordered list of possible frequency locations from the serving cell. In an example, ordered list obtaining component 344 can obtain the ordered list from the serving cell as a reduced ordered list, as described. For example, the reduced ordered list may include a reduced list of possible frequency locations or can otherwise include information for determining the reduced ordered list, such as an indication of indices of frequencies in the ordered list (e.g., that is stored in a configuration at the UE 115) that can comprise the reduced ordered list, etc.

Furthermore, for example, ordered list obtaining component 344 can obtain the ordered list, as described, and can then also receive the reduced ordered list of frequency locations from the serving base station 105 (e.g., in RRC configuration). In one example, the UE 115 can use the ordered list to search for synchronization signals in initial acquisition, and then may receive the reduced ordered list from the serving base station 105 after establish communications therewith. Moreover, in an example, ordered list obtaining component 344 can receive the ordered list along with, or as corresponding to, a measurement gap configuration received from the base station 105 for performing one or more intra-frequency or inter-frequency measurements for neighboring cell synchronization signals at one or more frequency bands based on the frequency locations indicated by the ordered list and/or the reduced ordered list.

In method 500, at Block 506, the UE can search for the synchronization signal at the one or more possible frequency locations in the ordered list of possible frequency locations. In an aspect, synchronization channel frequency detecting component 340, e.g., in conjunction with processor(s) 305, memory 302, and/or transceiver 370, can search for the synchronization signal at the one or more possible frequency locations in the ordered list of possible frequency locations. For example, synchronization channel frequency detecting component 340 can start with a highest priority possible frequency location in the ordered list (e.g., based on a priority or order indicated by the ordered list), and search for a synchronization signal at the highest priority possible frequency location in the ordered list. This can include tuning transceiver 370 to the highest priority possible frequency location in the ordered list, and attempting to detect one or more synchronization signals transmitted around the frequency. If no synchronization signal is detected, synchronization channel frequency detecting component 340 can tune the transceiver 370 to a next highest priority possible frequency location in the ordered list and attempt to detect a synchronization signal, and so on. For example, the ordered list may explicitly indicate the frequency and/or channel numbers (e.g., EARFCN), an index of the frequency and/or channel numbers along the synchronization channel raster for the frequency band, etc.

In another example, as described, the ordered list may include possible frequency locations grouped in a priority group. In this example, synchronization channel frequency detecting component 340 can select a frequency location from the group, attempt to detect a synchronization signal, select another frequency location from the same group if a synchronization signal is not detected, etc. for the frequency locations in the group, before selecting frequency locations in a next highest priority group, etc. As described, synchronization channel frequency detecting component 340 can search for the synchronization signal as part of an initial system acquisition and/or as part of performing cell measurements in measurement gaps configured by a serving cell.

In an example, the ordered list (and/or a plurality of obtained ordered lists) can include possible frequency locations for each of multiple frequency bands in a wireless communication technology. For example, in this regard, at Block 508, the UE can optionally search for the synchronization signal at the one or more second possible frequency locations at another frequency band as indicated in the ordered list of possible frequency locations. In an aspect, synchronization channel frequency detecting component 340, e.g., in conjunction with processor(s) 305, memory 302, and/or transceiver 370, can search for the synchronization signal at the one or more second possible frequency locations at another frequency band as indicated in the ordered list of possible frequency locations. For example (e.g., once all possible frequency locations for a frequency band, such as a serving frequency band, are searched for synchronization signals, or otherwise), synchronization channel frequency detecting component 340 can tune the transceiver to the one or more second possible frequency locations at another frequency band. For example, where the UE 115 searches the frequency locations as part of a measurement gap configuration from a serving cell, synchronization channel frequency detecting component 340 can perform intra-frequency measurements at possible frequency locations of a serving frequency band first, and then if no synchronization signals are found or detected, can perform inter-frequency measurements at the one or more second possible frequency locations, and so on until a synchronization signal is detected.

In method 500, at Block 510, the UE can synchronize timing with one or more cells based at least in part on the synchronization signal. In an aspect, transceiver 370, e.g., in conjunction with processor(s) 305 and/or memory 302, can synchronize timing with the one or more cells based at least in part on the synchronization signal. Thus, the UE 115 can perform synchronization by analyzing possible frequency locations of the synchronization signals based on a priority to lessen a number of frequency locations the UE 115 may need to evaluate at one or more frequency bands.

Figure 7:
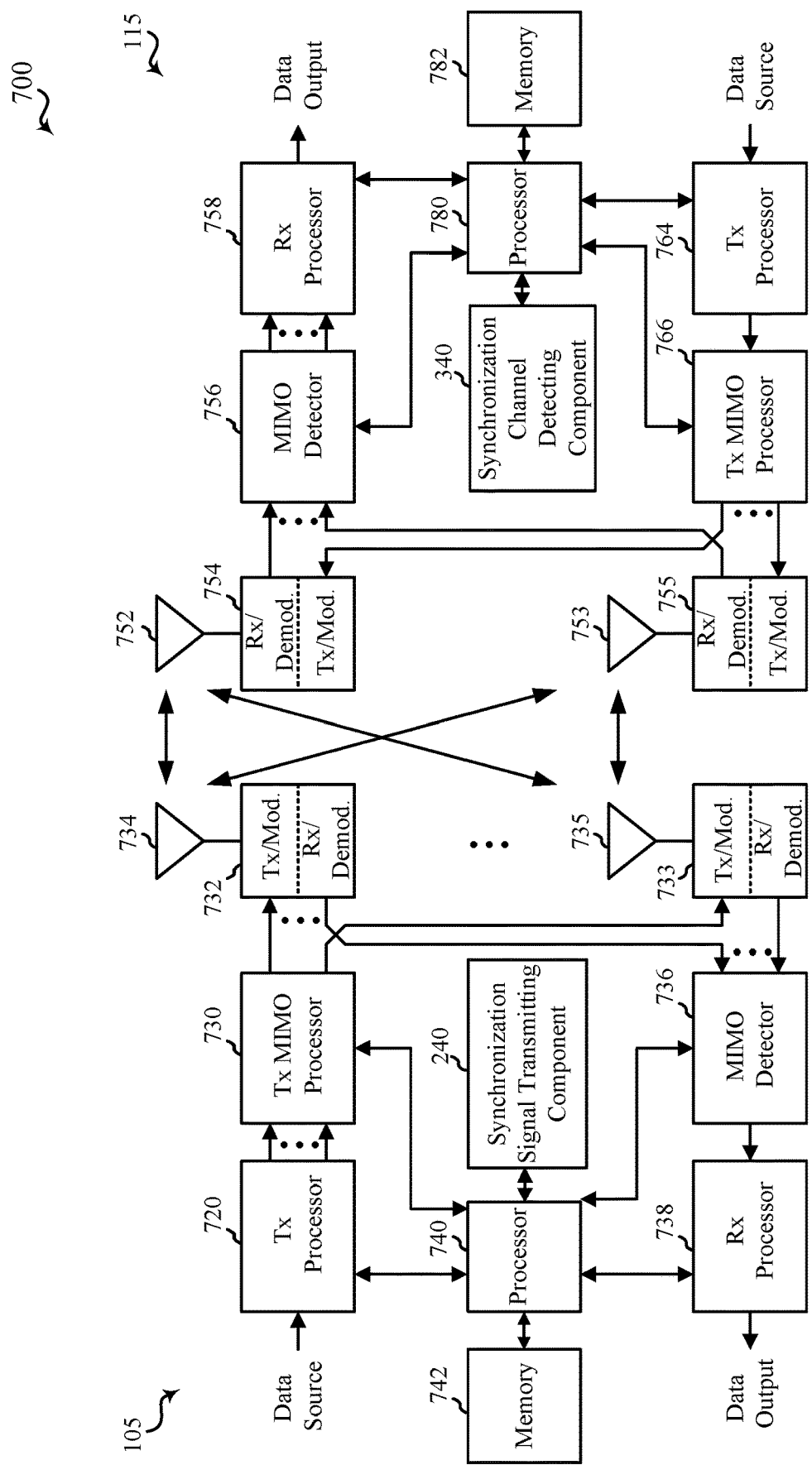
FIG. 7 is a block diagram illustrating an example of a MIMO communication system including a base station and a UE, in accordance with various aspects of the present disclosure.

FIG. 7 is a block diagram of a MIMO communication system 700 including a base station 105 and a UE 115. The MIMO communication system 700 may illustrate aspects of the wireless communication system 100 described with reference to FIG. 1. The base station 105 may be an example of aspects of the base station 105 described with reference to FIGS. 1, 2, and 3. The base station 105 may be equipped with antennas 734 and 735, and the UE 115 may be equipped with antennas 752 and 753. In the MIMO communication system 700, the base station 105 may be able to send data over multiple communication links at the same time. Each communication link may be called a "layer" and the "rank" of the communication link may indicate the number of layers used for communication. For example, in a 2×2 MIMO communication system where base station 105 transmits two "layers," the rank of the communication link between the base station 105 and the UE 115 is two.

At the base station 105, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 115 may be an example of aspects of the UEs 115 described with reference to FIGS. 1, 2, and 3. At the UE 115, the UE antennas 752 and 753 may receive the DL signals from the base station 105 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 115 to a data output, and provide decoded control information to a processor 780, or memory 782.

The processor 780 may in some cases execute stored instructions to instantiate a synchronization channel frequency detecting component 340 (see e.g., FIGS. 1 and 3).

On the uplink (UL), at the UE 115, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 105 in accordance with the communication parameters received from the base station 105. At the base station 105, the UL signals from the UE 115 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The processor 740 may in some cases execute stored instructions to instantiate a synchronization signal transmitting component 240 (see e.g., FIGS. 1 and 2).

The components of the UE 115 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 105 may, individually or collectively, be implemented with one or more ASICs adapted to perform some or all of the applicable functions in hardware. Each of the noted components may be a means for performing one or more functions related to operation of the MIMO communication system 700.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for acquiring, by a user equipment (UE), a synchronization signal transmitted at a frequency location, comprising:

obtaining an ordered list of possible frequency locations within a frequency band at which the synchronization signal may be transmitted, wherein obtaining the ordered list of possible frequency locations comprises receiving the ordered list of possible frequency locations from a serving cell as a reduced ordered list of possible frequency locations, wherein the reduced ordered list is reduced from multiple possible frequency locations specified for the frequency band for a synchronization channel raster, for detecting synchronization signals, wherein the synchronization channel raster is coarser than a channel raster used to define a center carrier frequency for communicating over a system bandwidth, and wherein the reduced ordered list includes multiple ordered possible frequency locations; and searching for the synchronization signal at one or more possible frequency locations in the ordered list of possible frequency locations, wherein the searching the one or more possible frequency locations is performed according to an order indicated in the ordered list of possible frequency locations and comprises tuning a transceiver to the one or more possible frequency locations according to the order indicated in the ordered list to detect the synchronization signal from one or more cells.

2. The method of claim 1, further comprising:

where the synchronization signal is not found at the one or more possible frequency locations, searching for the synchronization signal at one or more second possible frequency locations at another frequency band as indicated in the ordered list of possible frequency locations.

3. The method of claim 1, further comprising obtaining the multiple possible frequency locations specified for the frequency band based at least in part on a configuration stored in the UE.

4. The method of claim 1, wherein searching the one or more possible frequency locations comprises searching the one or more possible frequency locations in the reduced ordered list of possible frequency locations for a neighboring cell synchronization signal from one or more neighboring cells.

5. The method of claim 1, wherein the ordered list of possible frequency locations comprises frequency locations for the frequency band corresponding to a serving frequency band of the serving cell and other frequency locations for one or more other frequency bands.

6. The method of claim 1, wherein the searching the one or more possible frequency locations comprises selecting the one or more possible frequency locations from groups of frequency locations based on a corresponding priority of the groups of frequency locations indicated in the ordered list of possible frequency locations.

7. The method of claim 1, further comprising synchronizing timing with one or more cells based at least in part on the synchronization signal.

8. A method for transmitting, by a base station, a synchronization signal at a frequency location, comprising:
   obtaining an ordered list of possible frequency locations within a frequency band at which synchronization signals may be transmitted, wherein obtaining the ordered list of possible frequency locations comprises generating the ordered list of possible frequency locations as a reduced ordered list of possible frequency locations,
   wherein the reduced ordered list is reduced from multiple possible frequency locations specified for the frequency band for a synchronization channel raster, for detecting synchronization signals, wherein the synchronization channel raster is coarser than a channel raster used to define a center carrier frequency for communicating over a system bandwidth, and wherein the reduced ordered list includes multiple ordered possible frequency locations;
   selecting a synchronization channel frequency from the ordered list of possible frequency locations;
   transmitting the reduced ordered list of possible frequency locations to a user equipment (UE); and
   transmitting the synchronization signal at the synchronization channel frequency of the frequency band.

9. The method of claim 8, further comprising obtaining the multiple possible frequency locations specified for the frequency band based at least in part on a configuration stored in the base station.

10. The method of claim 8, wherein generating the ordered list of possible frequency locations as the reduced ordered list of possible frequency locations is based on receiving an indication of one or more possible frequency locations used by one or more neighboring cells.

11. The method of claim 8, wherein the reduced ordered list of possible frequency locations comprises frequency locations for the frequency band and other frequency locations for one or more other frequency bands.

12. The method of claim 8, further comprising transmitting a measurement gap configuration to the UE along with the reduced ordered list of possible frequency locations.

13. An apparatus for acquiring a synchronization signal transmitted at a frequency location, comprising:
   a transceiver for communicating one or more wireless signals via one or more antennas;
   a memory configured to store instructions; and
   at least one processor communicatively coupled with the transceiver and the memory, wherein the at least one processor is configured to:
      obtain an ordered list of possible frequency locations within a frequency band at which the synchronization signal may be transmitted at least in part by receiving the ordered list of possible frequency locations from a serving cell as a reduced ordered list of possible frequency locations,
      wherein the reduced ordered list is reduced from multiple possible frequency locations specified for the frequency band for a synchronization channel raster, for detecting synchronization signals, wherein the synchronization channel raster is coarser than a channel raster used to define a center carrier frequency for communicating over a system bandwidth, and wherein the reduced ordered list includes multiple ordered possible frequency locations; and
      search for the synchronization signal at one or more possible frequency locations in the ordered list of possible frequency locations, wherein the searching the one or more possible frequency locations is performed according to an order indicated in the ordered list of possible frequency locations and comprises tuning a transceiver to the one or more possible frequency locations according to the order indicated in the ordered list to detect the synchronization signal from one or more cells.

14. The apparatus of claim 13, wherein the at least one processor is configured to, where the synchronization signal is not found at the one or more possible frequency locations, search for the synchronization signal at one or more second possible frequency locations at another frequency band as indicated in the ordered list of possible frequency locations.

15. The apparatus of claim 13, wherein the at least one processor is further configured to obtain the multiple possible frequency locations specified for the frequency band based at least in part on a configuration stored in the apparatus.

16. The apparatus of claim 13, wherein the at least one processor is configured to search the one or more possible frequency locations at least in part by searching the one or more possible frequency locations in the reduced ordered list of possible frequency locations for a neighboring cell synchronization signal from one or more neighboring cells.

17. The apparatus of claim 13, wherein the ordered list of possible frequency locations comprises frequency locations for the frequency band corresponding to a serving frequency band of the serving cell and other frequency locations for one or more other frequency bands.

18. The apparatus of claim 13, wherein the at least one processor is configured to search the one or more possible frequency locations at least in part by selecting the one or more possible frequency locations from groups of frequency locations based on a corresponding priority of the groups of frequency locations indicated in the ordered list of possible frequency locations.

19. The apparatus of claim 13, wherein the at least one processor is further configured to synchronize timing with one or more cells based at least in part on the synchronization signal.

20. An apparatus for transmitting a synchronization signal at a frequency location, comprising:
   a transceiver for communicating one or more wireless signals via one or more antennas;
   a memory configured to store instructions; and
   at least one processor communicatively coupled with the transceiver and the memory, wherein the at least one processor is configured to:
      obtain an ordered list of possible frequency locations within a frequency band at which synchronization signals may be transmitted at least in part by generating the ordered list of possible frequency locations as a reduced ordered list of possible frequency locations,
      wherein the reduced ordered list is reduced from multiple possible frequency locations specified for the frequency band for a synchronization channel raster, for detecting synchronization signals, wherein the synchronization channel raster is coarser than a channel raster used to define a center carrier frequency for communicating over a system bandwidth, and wherein the reduced ordered list includes multiple ordered possible frequency locations;

select a synchronization channel frequency from the ordered list of possible frequency locations;

transmit the reduced ordered list of possible frequency locations to a user equipment (UE); and transmit the synchronization signal at the synchronization channel frequency of the frequency band.

21. The apparatus of claim 20, wherein the at least one processor is further configured to obtain the multiple possible frequency locations specified for the frequency band based at least in part on a configuration stored in the apparatus.

22. The apparatus of claim 20, wherein the at least one processor is configured to generate the ordered list of possible frequency locations as the reduced ordered list of possible frequency locations based on receiving an indication of one or more possible frequency locations used by one or more neighboring cells.

23. The apparatus of claim 20, wherein the reduced ordered list of possible frequency locations comprises frequency locations for the frequency band and other frequency locations for one or more other frequency bands.

24. The apparatus of claim 20, wherein the at least one processor is further configured to transmit a measurement gap configuration to the UE along with the reduced ordered list of possible frequency locations.

* * * * *